United States Patent
Kugo et al.

(10) Patent No.: US 6,828,017 B2
(45) Date of Patent: Dec. 7, 2004

(54) HEAT-SENSITIVE ADHESIVE MATERIAL, METHOD OF PREPARING SAME AND METHOD OF USING SAME

(75) Inventors: Tomoyuki Kugo, Numazu (JP); Toshiaki Ikeda, Shizuoka-ken (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 09/962,495

(22) Filed: Sep. 25, 2001

(65) Prior Publication Data

US 2002/0064613 A1 May 30, 2002

(30) Foreign Application Priority Data

Sep. 29, 2000 (JP) ........................................ 2000-300803
Sep. 29, 2000 (JP) ........................................ 2000-300941

(51) Int. Cl.[7] ............................ B32B 15/04; B32B 7/12; B32B 8/02
(52) U.S. Cl. .................... 428/349; 428/346; 428/355 R; 428/355 AC; 428/355 EN; 428/339; 428/652; 428/913; 428/36.91; 156/320; 156/327; 156/380.9
(58) Field of Search ................ 428/35.7, 36.9, 428/36.91, 102, 423, 40.1, 352, 200, 346, 347, 65.2, 97, 349, 355 R, 713, 906, 355 AC, 355 EN, 339, 332, 87; 156/320, 325, 326, 327, 380.9; 523/200; 524/235; 503/200, 207, 226

(56) References Cited

U.S. PATENT DOCUMENTS 5,541,035 A * 7/1996 Omote et al. ................ 430/257
6,043,190 A * 3/2000 Ichikawa et al. ............ 503/200

FOREIGN PATENT DOCUMENTS

| JP | 01290497 A | * 11/1989 | ............ B41M/5/26 |
| JP | 8217925 | 8/1993 | |
| JP | 8118575 | 5/1996 | |

* cited by examiner

Primary Examiner—Michael C. Miggins
(74) Attorney, Agent, or Firm—Cooper & Dunham LLP (57) ABSTRACT

A heat-sensitive adhesive material including a substrate and a heat-sensitive adhesive layer provided thereon. The adhesive layer has one of the following properties (a) and (b):

(a) the heat-sensitive adhesive layer, when thermally activated, exhibits an adhesive strength in the range of 1800–3500 gf/40 mm at 0–10° C.;

(b) the heat-sensitive adhesive layer, when thermally activated, exhibits a scratch resistance in the range of 150–500 gf at 0° C.

45 Claims, 1 Drawing Sheet

FIG. 1

HEAT-SENSITIVE ADHESIVE MATERIAL, METHOD OF PREPARING SAME AND METHOD OF USING SAME

BACKGROUND OF THE INVENTION

This invention relates to a heat-sensitive adhesive material which is non-adhesive at ambient temperature but becomes and remains adhesive upon and after being thermally activated. The present invention is also directed to a method of preparing such a heat-sensitive adhesive material and to a method of use thereof.

Adhesive sheets and labels have been used for various applications such as for indication of price, bar codes, quality and amount of goods and for advertisement (stickers). An adhesive sheet or label generally is composed of a substrate having one side provided with an information indicating layer and the other side on which an adhesive layer and a backing paper are laminated in this order. Information is recorded on the information indicating layer by various methods such as ink jet recording, heat-sensitive recording and pressure-sensitive recording. After recording, the backing paper is peeled away from the sheet or label and the exposed adhesive layer is bonded to a material to be bonded.

The above adhesive sheet has a problem in saving of resources because the backing paper is discarded without being recycled. Further, the adhesive sheet after the release of the backing paper poses a difficulty in handling because of the tackiness of the adhesive layer. Thus, the adhesive layer is apt to be adhered to an unwanted surface to cause curl, wrinkle or breakage thereof.

To cope with the above problems, there has been proposed a liner-free adhesive material (heat-sensitive adhesive material) which includes a substrate, an information indicating layer provided on one side of the substrate and a heat-sensitive adhesive layer provided on the other side of the substrate. The heat-sensitive adhesive layer is non-adhesive at ambient temperature but is capable of exhibiting adhesiveness when heated. The adhesive layer is composed of a thermoplastic resin, a plasticizer and, optionally, an additive such as a tackiness improver and is generally formed by applying a coating liquid containing these ingredients on the substrate.

The heat-sensitive adhesive layer does not at all show tackiness at room temperature. When thermally activated, however, the adhesive layer becomes adhesive. Such adhesiveness remains for a certain period of time even when the heat is removed therefrom. Although not yet fully clarified, the mechanism of the development of adhesiveness is considered to be such that, when the heat-sensitive adhesive material is heated, the plasticizer, when it is solid, is melted into an oily state and penetrates between the molecules of the thermoplastic resin. When a liquid plasticizer is, it is confined within microcapsules. In such a case, shells of the microcapsules are thermally destroyed, when the heat-sensitive adhesive material is heated, so that the plasticizer can plasticize the thermoplastic resin.

Because of freedom of the covering paper, the heat-sensitive adhesive material is advantageous from the standpoint of saving of resources and protection of environment. In addition, the adhesive material when bonded to an unwanted surface permits release from the surface by mere heating. Thus, the heat-sensitive adhesive material is now attractive in various fields.

Published Unexamined Japanese Utility Model Application No. H01-137263, Published Unexamined Japanese Utility Model Application No. H10-35126 and Published Unexamined Japanese Patent Application No. H01-254993 disclose the use of a heating plate, hot air, infrared rays or a thermal head for thermally activating heat-sensitive adhesive materials.

Known heat-sensitive adhesive materials have a serious problem that the adhesiveness and the anti-blocking properties are still below a level required in the market.

With regard to adhesiveness, the following problem exists. Hitherto, since polyvinyl chloride films have been used for wrapping foods, backing paper-bearing adhesive labels developed for POS (point of sales) system have been those suited for bonding to polyvinyl chloride films. Because of problems of dioxins, polyolefin films are now being substituted for polyvinyl chloride films. However, the existing backing paper-bearing adhesive labels have a problem that they fail to show sufficient adhesion strength to a polyolefin film. In particular, the adhesive layer is poor in bonding to and compatibility with a polyolefin resin film and is easily delaminated therefrom. While a lot of proposals have been made to overcome the problem, no satisfactory solution has been made. This also applies to liner-free adhesive material or heat-sensitive adhesive material.

Currently, there is a demand for a heat-sensitive adhesive material which exhibits satisfactory adhesiveness at low temperatures. However, the present inventors expect that there will be a need for a heat-sensitive adhesive material which exhibits satisfactory adhesiveness not only at low temperatures but also at higher temperatures of 35–40° C. Namely, it is expected that there will be a demand for a heat-sensitive adhesive material which can exhibits high adhesion strength in a wide temperature range and yet can keep the adhesiveness for a long time. Such a need has never been discussed, however.

With regard to anti-blocking property, the following problems exist. Blocking is a phenomenon of undesirable occurrence of tackiness when a heat-sensitive adhesive material is exposed to a temperature higher than room temperature for a long period of time. In general, a heat-sensitive adhesive material is an elongated sheet wound around a mandrel into a roll or cut stacked sheets. Thus, when blocking occurs, the heat-sensitive adhesive layer adheres to its adjacent information indicating layer, so that the heat-sensitive adhesive material is no longer usable. When blocking occurs in a heat-sensitive adhesive material mounted on a recording device, the material cannot smoothly run through the device. When an image is recorded on the information indicating layer, blocking may cause erasure of the recorded information.

A variety of proposals have been made for the purpose of preventing blocking problems. Published Examined Japanese Patent Application No. S62-21835 proposes addition of a wax having slipping property to a heat-sensitive adhesive layer. Published Unexamined Japanese Patent Application No. H02-282050 suggests incorporation of an inorganic material into a heat-sensitive adhesive layer. Published Unexamined Japanese Patent Applications No. H06-57223, No. H06-100847 and No. H06-10848 propose protecting surfaces of solid plasticize with an inorganic compound or collide particles for the prevention of softening thereof.

The incorporation of a wax is, however, insufficient to prevent blocking. Rather, the adhesion strength of the heat-sensitive adhesive layer upon thermal activation is lowered. The addition of an inorganic material is also insufficient to prevent blocking. A solid plasticizer whose surface has been protected by an inorganic compound or colloid particles causes problems because melting and diffusing of the plasticizer are slow so that the adhesiveness is not quickly developed during thermal activation or the adhesion strength of the heat-activated adhesive layer is lowered.

Blocking could be prevented when a plasticizer having a high melting point is used. In this case, however, adhesion strength is considerably lowered. Thus, the conventional measures for improving anti-blocking properties are not satisfactory.

SUMMARY OF THE INVENTION

It is, therefore, a first object of the present invention to provide a heat-sensitive adhesive material which, upon being thermally activated, exhibits adhesiveness even at a low temperature, has high adhesion strength and retains the high adhesiveness for a long period of time.

A second object of the present invention is to provide a heat-sensitive adhesive material which, upon being thermally activated, exhibits adhesiveness not only at a low temperature but also at a high temperature, namely in a wide temperature range, has high adhesion strength and retains the high adhesiveness for a long period of time.

It is a third object of the present invention to provide a heat-sensitive adhesive material which has good anti-blocking property even when exposed to a relatively high temperature.

It has been found that the use of a supercooling improving agent is effective to provide a heat-sensitive adhesive material having a heat-sensitive adhesive layer which, when thermally activated, exhibits an adhesive strength to a polyolefin resin surface of at least 1800 gf/40 mm at 0–10° C. and which exhibits such adhesiveness for a long period of time.

Thus, it has been found that a heat-sensitive adhesive layer which comprises a thermoplastic resin, a solid plasticizer and a supercooling improving agent exhibits higher adhesiveness at low temperatures than that of known heat-sensitive adhesive layer.

It has been also found that the first object may also be accomplished by a heat-sensitive material having a heat-sensitive adhesive layer which, when thermally activated, exhibits a scratch resistance in the range of 150–500 gf at 0° C.

The scratch resistance is measured in accordance with Japanese Industrial Standard JIS K5401 except that a ball-point pen is substituted for a pencil. The measurement is carried out under the following conditions:

Pen: ball-point pen using an alumina ball having a diameter of 0.1 mm

Load: 1.0 kg

Scratch speed: 75 mm/min

Contact angle between pen and surface to be measured (surface of an adhesive layer): 45°

It has been also found that the above-mentioned second and third objects may be accomplished when a supercooling improving agent is used in conjunction with a solid plasticizer having a high melting point. In particular, the conjoint use of a supercooling improving agent and a high melting point plasticizer is effective to provide a heat-sensitive adhesive material having a heat-sensitive layer which, when thermally activated, exhibits an adhesive strength to a polyolefin resin surface of 500–3500 gf/40 mm not only at 0–10° C. but also at a high temperature of about 40° C., namely in a wide temperature range. In addition, excellent anti-blocking property such that no blocking occurs when exposed to 60° C. or more is obtainable.

It has been further found that the above second object can be accomplished by a heat-sensitive adhesive material having a heat-sensitive adhesive layer which, when thermally activated, provides a scratch resistance in the range of 150–500 gf at both 0° C. and 20° C. Such a heat-sensitive adhesive material exhibits an adhesive strength of 500–3500 gf/40 mm not only at 0–10° C. but also at a high temperature of about 40° C.

It has been further found that the above third object can be accomplished by a heat-sensitive adhesive material having a heat-sensitive adhesive layer which shows a gloss A1 during non-activated state and a gloss A2 being thermally activated by being contacted with a heated surface at 80° C. for 1 second at a pressure of 2 kg/cm$^2$, and wherein (A1–A2) is in the range of –20% to 20%. Such a heat-sensitive adhesive material has excellent anti-blocking property such that no blocking occurs when exposed to 60° C. or more.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

A heat-sensitive adhesive material according to the present invention includes a substrate, an information recording layer provided on one side of the substrate and a heat-sensitive adhesive layer provided on the other side of the substrate. The heat-sensitive adhesive layer is composed of a thermoplastic resin, a plasticizer and, optionally, an additive such as a tackiness improver. The thermoplastic resin used for the purpose of the present invention may be non-adhesive or adhesive per se. For reasons of high adhesiveness, the use of a thermoplastic resin having adhesive property is preferred. The plasticizer may be a liquid, a solid or a mixture thereof.

In one aspect of the present invention the heat-sensitive adhesive layer has at least one of the following properties (a) and (b):

(a) the heat-sensitive adhesive layer, when thermally activated, exhibits an adhesive strength in the range of 1800–3500 gf/40 mm at 0–10° C.;

(b) the heat-sensitive adhesive layer, when thermally activated, exhibits a scratch resistance in the range of 150–500 gf at 0° C.

The above-described object can be accomplished when the heat-sensitive adhesive layer satisfies property (a) or property (b). As long as the above condition is met, any method may be adopted for the purpose of the present invention.

One preferred method is to use a supercooling improving agent. The supercooling improving agent may be incorporated into a protecting layer provided over the heat-sensitive adhesive layer. Preferably, the supercooling improving agent is incorporated into the heat-sensitive adhesive layer. The following description will be made on the latter preferred embodiment.

Although not wishing to be bound by the theory, a mechanism of improving adhesiveness by the use of the supercooling improving agent is considered to be as follows.

Before thermal activation, since the thermoplastic resin is covered with the solid plasticizer, at least a surface of the heat-sensitive adhesive layer is non-adhesive even when the thermoplastic resin is adhesive per se. When the heat-sensitive adhesive layer is thermally activated (heated at a temperature higher than the melting point of the solid plasticizer), the solid plasticizer melts and penetrates into a space between molecules of the thermoplastic resin, so that the thermoplastic resin is plasticized and softened to exhibit adhesiveness. In the absence of the supercooling improving agent, the melted plasticizer solidifies and becomes amorphous or aggregate when the heat-sensitive adhesive layer is cooled to a low temperature. As a consequence, the adhesiveness of the thermoplastic resin is lowered and, hence, the heat-sensitive adhesive material is not easily adhered to a surface to be bonded such as a polyolefin resin surface. Further, such a heat-sensitive adhesive material adhered during hot to a surface to be bonded is also apt to be delaminated when the assembly is kept at a low temperature. Such delamination is considered to be caused for the same reasons, i.e. as a result of the solidification and aggregation of the plasticizer.

In the presence of the supercooling improving agent, on the other hand, both the plasticizer and the supercooling improving agent become an oily state upon the thermal activation of the heat-sensitive adhesive material. The oil penetrates into a space between molecules of the thermoplastic resin, so that the thermoplastic resin is plasticized and softened to exhibit adhesiveness. In this case, the supercooling improving agent is present in the state where the supercooling improving agent surrounds the plasticizer and where the oily particles of the plasticizer are separated from each other by the supercooling improving agent. Thus, even when the thermally activated heat-sensitive layer is cooled by being exposed to low temperature conditions or by being contacted with a cold surface to be bonded, the plasticizer particles are prevented from solidifying or aggregating and are kept in a oily state. Therefore, the plasticized and softened thermoplastic resin remain as is so that the heat-sensitive adhesive layer continues to exhibit adhesiveness. Namely, the supercooling improving agent serves to prevent the solid plasticizer, which has melted to form an oil upon the thermal activation of the heat-sensitive adhesive layer, from solidifying or being converted into an amorphous state and to allow the supercooling improving agent to be present in a liquid state, even when the thermally activated heat-sensitive layer is cooled by being exposed to low temperature conditions or by being contacted with a cold surface to be bonded. As a consequence, the adhesiveness of the thermoplastic resin is maintained even when the hat-sensitive adhesive material is exposed to a low temperature.

Thus, the supercooling improving agent serves to allow the solid plasticizer, melted into an oil by thermal activation of the heat-sensitive adhesive material, to be present as is, even when the melted plasticizer is exposed to room temperature or to low temperatures of, for example, −5° C. to 10° C.

Any supercooling improving agent may be used for the purpose of the present invention. Preferably, the supercooling improving agent is such a substance that, when it is mixed with a solid plasticizer and melted together, the mixture can be present as a liquid even when cooled to room temperature. It is further preferred that the supercooling improving agent have a melting point of 60–180° C., more preferably 70–130° C., for reasons of providing high adhesiveness at low temperatures.

The supercooling improving agent is generally used in an amount of 0.5–60 parts by weight, preferably 10–40% by weight, per 100 parts by weight of the solid plasticizer. The use of at least 10% by weight of the supercooling improving agent per 100 parts by weight of the solid plasticizer is preferable for reasons of high effectiveness of enhancing the supercooling property. The use of not greater than 40% by weight of the supercooling improving agent per 100 parts by weight of the solid plasticizer is preferable because of effective exhibition of the functions of the solid plasticizer.

The supercooling improving agent is desirably in the form of particles having an average particle diameter of 0.2–10 µm, more preferably 0.7–3.0 µm, for reasons of improved heat responsibility, easiness in melting and excellent exhibition of the desired function thereof relative to the solid plasticizer. Preferably the supercooling improving agent has such a particle size distribution that at least 90% by weight thereof have a particle diameter of not greater than 20.0 µm.

The supercooling improving agent is suitably an organic compound such as an aromatic oxy-substituted naphthalene, a biphenyl compound, a polyether compound, a carbonic acid diester or an oxalic acid diester. An oxalic acid diester or a biphenyl compound is preferably used.

The aromatic oxy-substituted naphthalene may be a compound represented by the following formula (20):

(20)

wherein $R^4$ represents an aromatic group. The aromatic group may be an aralkyl group having 7–22 carbon atoms, preferably 7–12 carbon atoms, such as a benzyl group, a phenethyl group, a naphthylmethyl group or a naphthylethyl group, or an aryl group having 6–22, preferably 6–12 carbon atoms, such as a phenyl group, a tolyl group or a naphthyl group.

Illustrative of suitable aromatic oxy-substituted naphthalene are 2-benzyloxynaphthalene, 2-phenethyloxynaphthalene, 1-benzyloxynaphthalene and 2-phenyloxynaphthalene.

The biphenyl compound may be a compound represented by the following formula (21):

(21)

wherein $R^5$ stands for an acyl group, an aralkyl group, an aryl group or an alkyloxy group. The acyl group may be an aliphatic acyl group having an alkyl group with 1–12, preferably 1–8 carbon atoms. The aralkyl group may be, for example, a benzyl group, a phenethyl group or a naphthylmethyl group. The aryl group may be a phenyl group, a tolyl group or a naphthyl group. The alkyloxy group may be an alkoxyl group having an alkyl or alkenyl group with 1–12, preferably 2–8 carbon atoms.

The use of a biphenyl compound is particularly preferred for reasons of high supercooling improving effect. Illustrative of suitable biphenyl compounds are acetylbiphenyl, p-benzylbiphenyl and 4-allyloxybiphenyl.

The polyether compound may be a compound represented by the following formulas (22), (23) and (24):

(22)

(23)

(24)

wherein $R_6$ and $R_7$ stand independently from each other for an alkyl group having 1–12, preferably 2–8 carbon atoms, $R_8$ and $R_9$ stand independently from each other for an alkylene group having 2–12, preferably 2–8 carbon atoms, $R_{10}$ and $R_{11}$ stand independently from each other for an alkyl group having 1–12, preferably 1–8 carbon atoms, $Ar_1$, $Ar_2$, $Ar_3$ and $Ar_4$ stand independently from each other for an aryl group having 6–22, preferably 6–12 carbon atoms or an aralkyl group having 7–22, preferably 7–12 carbon atoms and $Ar_5$ and $Ar_6$ stand independently from each other for an arylene group having 6–22, preferably 6–12 carbon atoms or an aralkylene group having 8–22, preferably 8–12 carbon atoms.

Illustrative of suitable polyether compounds are 1,2-bis (3-methylphenoxy)ethane, 2,2'-bis(4-methoxyphenoxy) diethyl ether and bis(4-methoxyphenyl) ether.

The carbonic acid diester may be a compound represented by the following formula (25):

(25)

wherein $R_6$ and $R_7$ stand independently from each other for an aralkyl group having 7–22, preferably 7–12 carbon atoms, such as a benzyl group, a phenethyl group or a naphthylmethyl group or an aryl group having 6–22, preferably 6–12 carbon atoms, such as a phenyl group, a tolyl group or a naphthyl group.

Illustrative of suitable carbonic acid diesters are dibenzyl carbonate, diphenethyl carbonate, diphenyl carbonate and dinaphthylmethyl carbonate.

The oxalic acid diesters may be a compound represented by the following formula (26):

(26)

wherein $Ar^1$ and $Ar^2$ stand independently from each other for an aromatic group which may contain one or more substituents. The aromatic group may be an aralkyl group having 7–22 carbon atoms, preferably 7–12 carbon atoms, such as a benzyl group, a phenethyl group, a naphthylmethyl group or a naphthylethyl group, or an aryl group having 6–22 carbon atoms, preferably 6–12 carbon atoms, such as a phenyl group, a tolyl group or a naphthyl group. The substituent may be an alkoxyl group having 1–6 carbon atoms or a halogen atom.

The use of a oxalic acid diester is particularly preferred for reasons of high supercooling improving effect. Illustrative of suitable oxalic acid diesters are dibenzyl oxalate and di(p-chlorobenzyl) oxalate.

The plasticizer for use in the present invention may be a solid or a liquid. Thus, any plasticizer may be used as long as it is effective to provide high adhesiveness under a low temperature condition. The use of a plasticizer which is solid at room temperature and which serves to develop adhesiveness of a thermoplastic resin is suitably used for the purpose of the present invention, in particular for providing a heat-sensitive adhesive material having excellent anti-blocking properties. Examples of such solid plasticizers include hindered phenol compounds, benzotriazole compounds, aromatic sulfonamide and phthalic acid compounds.

It is desirable to use a solid plasticizer having a relatively high melting point, preferably 70–200° C., more preferably 100–150° C., for reasons of providing heat-sensitive adhesive material having such high anti-blocking properties that no blocking occurs even when the material is exposed to a temperature of 60° C. or more.

It is also desirable that the plasticizer, when heated, melted and then cooled to 20° C., does not solidify but remains liquid.

A heat-sensitive adhesive material having high anti-blocking properties may be obtained by using a solid plasticizer which satisfies the above features. This fact per se is one of novel aspects of the present invention.

As described previously, the third object of the present invention can be accomplished by a heat-sensitive adhesive material having a heat-sensitive adhesive layer which shows a gloss A1 during non-activated state and a gloss A2 upon being thermally activated by being contacted with a heated surface at 80° C. for 1 second at a pressure of 2 kg/cm², and wherein (A1–A2) is in the range of −20% to 20%. The method of measuring the gloss will be described hereinafter.

As described previously, the second object of the present invention can be accomplished by a heat-sensitive material having a heat-sensitive adhesive layer which, when thermally activated, exhibits a scratch resistance in the range of 150–500 gf at both 0° C. and 20° C.

One of the specific means for accomplishing the second object of the present invention is to use the above super-cooling improving agent in conjunction with a high melting point solid plasticizer. The heat-sensitive adhesive material obtained as above exhibit an adhesive strength in the range of 500–3500 gf/40 mm at 0–40° C.

The hindered phenol compound used as a solid plasticizer in the present invention is a compound which is solid at room temperature and which has a substituent at each of the two carbon atoms adjacent to that carbon atom to which the phenolic hydroxyl group is bonded, at least one of the substituents being a sterically hindered group. The sterically hindered group may be, for example, a tertiary alkyl group having 4–8 carbon atoms such as a t-butyl group, a t-amyl group, t-hexyl group or a t-octyl group. One of the substituent when it is a non-sterically hindered group may be a n-alkyl or iso-alkyl group having 1–8, preferably 1–6 carbon atoms, such as methyl, ethyl, n-propyl, iso-propyl, n-butyl, iso-butyl, n-amyl, iso-amyl, n-hexyl, iso-hexyl, n-octyl or iso-octyl.

One example of the hindered phenol compound may be a compound having 1–6, preferably 2–4 groups of the following formula (2):

(2)

wherein $R^1$ and $R^2$ stand independently from each other for a sterically hindered group such as a t-butyl group or a non-sterically hindered group such as an alkyl group such as a methyl group, with the proviso that at least one of $R^1$ and $R^2$ stands for the sterically hindered group.

The hindered phenol compound preferably has a melting point of 50–120° C., more preferably 55–100° C. It is preferred that the hindered phenol compound, when heated, melted and then cooled to 20° C., does not solidify but remains liquid.

Another example of the hindered phenol compound is a compound which is solid at room temperature and which has 1–6 phenol-containing groups having the following formula (3):

(3)

wherein $R^1$ and $R^2$ stand independently from each other for a sterically hindered group or non-sterically hindered group, with the proviso that at least one of $R^1$ and $R^2$ stands for the sterically hindered group, and $R^3$, $R^4$ and $R^5$ stand independently from each other an alkylene group having 1–12, preferably 2–8, more preferably 2–6 carbon atoms.

Examples of the sterically hindered groups and non-sterically hindered group may be those described previously. Illustrative of suitable alkylene groups are a methylene group, an ethylene group, a propylene group, a butylene group, an amylene group, a hexylene group, an octylene group and a dodecylene group.

A further example of the hindered phenol compound is a compound which is solid at room temperature and which has the following formula (4):

(4)

wherein $R^1$, $R^2$, $R^3$, $R^4$ and $R^5$ are as described above with regard to the formula (4).

A further example of the hindered phenol compound is a compound which is solid at room temperature and which has 2–6 phenol-containing groups having the following formula (5):

(5)

wherein $R^1$ and $R^2$ stand independently from each other for a sterically hindered group or non-sterically hindered group, with the proviso that at least one of $R^1$ and $R^2$ stands for the sterically hindered group, and $R^3$ and $R^4$ stand independently from each other for an alkylene group having 1–12, preferably 2–8, more preferably 2–6 carbon atoms.

Examples of the sterically hindered groups, non-sterically hindered groups and alkylene groups may be those described previously with regard to the formula (3).

A further example of the hindered phenol compound is a compound which is solid at room temperature and which has the following formula (6):

(6)

wherein $R^1$, $R^2$, $R^3$ and $R^4$ are as described above with regard to the formula (5).

A further example of the hindered phenol compound is a compound which is solid at room temperature and which has the following formula (7):

(7)

wherein $R^1$, $R^2$, $R^3$ and $R^4$ are as described above with regard to the formula (5) and n is an integer of 1–4.

A further example of the hindered phenol compound is a compound which is solid at room temperature and which has the following formula (8):

(8)

wherein $R^1$, $R^2$, $R^3$ and $R^4$ are as described above with regard to the formula (5).

A further example of the hindered phenol compound is a compound which is solid at room temperature and which has 1–6 phenol-containing groups of the following formula (9):

(9)

wherein $R^1$, $R^2$, $R^3$ and $R^4$ are as described above with regard to the formula (5).

A further example of the hindered phenol compound is a compound which is solid at room temperature and which has the following formula (10):

(10)

wherein $R^1$, $R^2$, $R^3$ and $R^4$ are as described above with regard to the formula (5).

A further example of the hindered phenol compound is a compound which is solid at room temperature and which has the following formula (11):

(11)

wherein $R^1$ and $R^2$ stand independently from each other for a sterically hindered group or non-sterically hindered group, with the proviso that at least one of $R^1$ and $R^2$ stands for the sterically hindered group, $R^3$ stands for an alkylene group having 1–12, preferably 2–8, more preferably 2–6 carbon atoms and $R^7$ and $R^8$ stand independently from each other for an alkyl group having 1 12, preferably 1–6, more preferably 2–4 carbon atoms.

Examples of the sterically hindered groups, non-sterically hindered groups and alkylene groups may be those described previously with regard to the formula (3). Examples of the alkyl group include methyl, ethyl, propyl, butyl, amyl, hexyl, heptyl, octyl, nonyl, decyl and dodecyl.

The benzotriazole compound used as a solid plasticizer in the present invention may be a compound which is solid at room temperature and which has a benzotriazole group of the following formula (12):

(12)

wherein X stands for a hydrogen atom, an alkyl group having 1–6 carbon atoms, an alkoxyl group having 1–6 carbon atoms or a halogen atom. Illustrative of the alkyl groups are methyl, ethyl, propyl, butyl, amyl and hexyl. Illustrative of halogen atoms are chlorine, bromine, iodine and fluorine.

An example of the benzotriazole compound may be a compound which is solid at room temperature and which has a benzotriazole group of the following formula (13):

(13)

wherein X stands for a hydrogen atom, an alkyl group having 1–6 carbon atoms, an alkoxyl group having 1–6 carbon atoms or a halogen atom and $R^9$ and $R^{10}$ stand independently from each other for a hydrogen atom, an alkyl group which has 1–22, preferably 1–12, more preferably 1–8 carbon atoms and which may have one or more substituents, an alkyloxy group which contains an alkyl group having 1–22, preferably 1–12, more preferably 1–8 carbon atoms and which may have one or more substituents or an alkenyloxy group which contains an alkyl group having 1–22, preferably 1–12, more preferably 1–8 carbon atoms and which may have one or more substituents.

Illustrative of the alkyl group having 1–6 carbon atoms and halogen atoms are as described above with regard to the formula (12). Illustrative of the alkyl groups having 1–22 carbon atoms are methyl, ethyl, propyl, butyl, amyl, hexyl, octyl, nonyl, decyl, dodecyl, stearyl, docosanyl, hexenyl, dodecenyl and dococenyl. Illustrative of the substituenets are a hydroxyl group, an alkoxyl group and a halogen atom.

Another example of the benzotriazole compound may be a compound which is solid at room temperature and which has a benzotriazole group of the following formula (14):

(14)

wherein X stands for a hydrogen atom, an alkyl group having 1–6 carbon atoms, an alkoxyl group having 1–6 carbon atoms or a halogen atom and $R^{11}$ stands for an alkyl group which has 1–22, preferably 1–12, more preferably 1–8 carbon atoms and which may have one or more substituents, an alkyloxy group which has 1–22, preferably 1–12, more preferably 1–8 carbon atoms and which may have one or more substituents or an alkenyloxy group which has 1–22, preferably 1–12, more preferably 1–8 carbon atoms and which may have one or more substituents.

Illustrative of the alkyl group having 1–6 carbon atoms, halogen atoms alkyl groups having 1–22 carbon atoms are those described above with reference to the formula (13). Illustrative of the substituents are a hydroxyl group, an alkoxyl group and a halogen atom.

A further example of the benzotriazole compound may be a compound which is solid at room temperature and which has a benzotriazole group of the following formula (15):

(15)

wherein X stands for a hydrogen atom, an alkyl group having 1–6 carbon atoms, an alkoxyl group having 1–6 carbon atoms or a halogen atom, $R^{12}$ stands for an alkyl group which has 1–22, preferably 1–12, more preferably 1–8 carbon atoms and which may have one or more substituents or an alkenyl group which has 2–22, preferably 2–12, more preferably 2–8 carbon atoms and which may have one or more substituents and $R^{13}$ stands for an alkylene group having 1–12 carbon atoms, preferably 2–8, more preferably 2–6 carbon atoms.

Illustrative of the alkyl group having 1–6 carbon atoms, halogen atoms alkyl groups having 1–22 carbon atoms are those described above with reference to the formula (13). Illustrative of the alkylene group are those described above with reference to the formula (3). Illustrative of the substituents are a hydroxyl group, an alkoxyl group and a halogen atom.

The benzotriazole compound preferably has a melting point of 50–120° C., more preferably 55–100° C. It is preferred that the benzotriazole compound, when heated, melted and then cooled to 20° C., does not solidify but remains liquid.

The aromatic sulfonamide compound used as a solid plasticizer in the present invention may be a compound which is solid at room temperature and which has an aromatic sulfonamide group of the following formula (16):

(16)

wherein X stands for a hydrogen atom, an alkyl group having 1–6 carbon atoms, an alkoxyl group having 1–6 carbon atoms or a halogen atom.

An example of the aromatic sulfonamide compound may be a compound which is solid at room temperature and which has the following formula (17):

(17)

wherein X stands for a hydrogen atom, an alkyl group having 1–6 carbon atoms, an alkoxyl group having 1–6 carbon atoms or a halogen atom and $R^{14}$ stands for a hydrogen atom, an aliphatic group which has 1–22 carbon atoms and which may have one or more substituents, or an aromatic group which has 6–22 and which may have one or more substituents.

The aliphatic group may be linear or cyclic. The linear aliphatic group may be an alkyl group having 1–22, preferably 1–12, more preferably 1–8 carbon atoms or an alkenyl group having 2–22, preferably 2–12, more preferably 2–8 carbon atoms. The cyclic aliphatic group may be a cycloalkyl group having 4–12, preferably 6–10 carbon atoms or a cycloalkenyl group having 4–12, preferably 6–10 carbon atoms. Illustrative of suitable linear aliphatic groups are methyl, ethyl, propyl, butyl, amyl, hexyl, octyl, nonyl, decyl, dodecyl, stearyl, docosanyl, hexenyl, dodecenyl and dococenyl. Illustrative of suitable cyclic aliphatic groups are a cyclohexyl group, a cyclohexenyl group and a cyclooctyl group.

The aromatic group may be an aralkyl group having 7–22 carbon atoms, preferably 7–12 carbon atoms, such as a benzyl group, a phenethyl group, a naphthylmethyl group, a naphthylethyl group or an anthramethyl group, or an aryl group having 6–22, preferably 6–12 carbon atoms, such as a phenyl group, a tolyl group, a naphthyl group, an anthracenyl group or a pyrenyl group.

Illustrative of the alkyl and alkoxyl groups having 1–6 carbon atoms are those described above with reference to the formula (13). Illustrative of the substituents are a hydroxyl group, an alkoxyl group and a halogen atom.

The aromatic sulfonamide compound preferably has a melting point of 50–120° C., more preferably 55–100° C. It is preferred that the aromatic sulfonamide compound, when heated, melted and then cooled to 20° C., does not solidify but remains liquid.

The phthalic acid compound used as a solid plasticizer in the present invention may be a compound which is solid at room temperature and which has an aromatic sulfonamide group of the following formula (18):

(18)

wherein X stands for a hydrogen atom, an alkyl group having 1–6 carbon atoms, an alkoxyl group having 1–6 carbon atoms or a halogen atom and $R^{15}$ and $R^{16}$ stand independently from each other for an aliphatic group which has 1–22 carbon atoms and which may have one or more substituents, or an aromatic group which has 6–22 and which may have one or more substituents.

The aliphatic group may be linear or cyclic. The linear aliphatic group may be an alkyl group having 1–22, preferably 1–12, more preferably 1–8 carbon atoms or an alkenyl group having 2–22, preferably 2–12, more preferably 2–8 carbon atoms. The cyclic aliphatic group may be a cycloalkyl group having 4–12, preferably 6–10 carbon atoms or a cycloalkenyl group having 4–12, preferably 6–10 carbon atoms. Illustrative of suitable linear aliphatic groups are methyl, ethyl, propyl, butyl, amyl, hexyl, octyl, nonyl, decyl, dodecyl, stearyl, docosanyl, hexenyl, dodecenyl and dococenyl. Illustrative of suitable cyclic aliphatic groups are a cyclohexyl group, a cyclohexenyl group and a cyclooctyl group.

The aromatic group may be an aralkyl group having 7–22 carbon atoms, preferably 7–12 carbon atoms, such as a benzyl group, a phenethyl group, a naphthylmethyl group, a naphthylethyl group or an anthramethyl group, or an aryl group having 6–22, preferably 6–12 carbon atoms, such as a phenyl group, a tolyl group, a naphthyl group, an anthracenyl group or a pyrenyl group.

Illustrative of the alkyl and alkoxyl groups having 1–6 carbon atoms are those described above with reference to the formula (13). Illustrative of the substituents are a hydroxyl group, an alkoxyl group and a halogen atom.

The phthalic acid compound preferably has a melting point of 50–120° C., more preferably 55–100° C. It is preferred that the aromatic sulfonamide compound, when heated, melted and then cooled to 20° C., does not solidify but remains liquid.

Specific examples of plasticizers include as follows.

Hindered Phenol Compounds:

No. 1

No. 2

No. 3

No. 4

Benzotriazole Compounds:

No. 5

No. 6

No. 7

No. 8

No. 9

No. 10

Aromatic Sulfonamide Compounds:

No. 11

No. 12

No. 13

No. 14

No. 15

No. 16

No. 17

No. 18

Phthalic Acid Compounds:

No. 19

No. 20

No. 21

No. 22

In the present invention, the use of at least one compound selected from Compounds No. 1, No. 2, No. 7 and No. 12 shown above is preferred.

In the heat-sensitive adhesive material of the present invention, a liquid plasticizer may be used. Examples of the liquid plasticizers include dibutyl adipate, di-2-ethylhexyl adipate, di-n-hexyl adipate, dibutyl sebacate, di-2-ethylhexyl sebacate, butyl hexyl phthalate, butyl benzyl phthalate, dimethyl phthalate, dibutyl phthalate, di-2-ethylhexyl phthalate, diethyl phthalate, diheptyl phthalate and dioctyl phthalate. These liquid plasticizer are generally encapsulated in microcapsules made of a resin such as polyurethane, polyurea, polyamide, polyester or urea-formaldehyde resin.

Any customarily employed thermoplastic resin may be suitably used in the heat-sensitive adhesive layer of the present invention. Examples of the thermoplastic resins include (meth)acrylaate copolymers, styrene-isoprene copolymers, styrene-acrylate copolymers, styrene-butadiene copolymers, acrylonitrile-butadiene copolymers, ethylene-vinyl acetate copolymers, vinyl acetate-acrylate copolymers, ethylene-vinyl chloride copolymers, ethylene-acrylate copolymers, vinyl acetate-ethylene-vinyl chloride copolymers, vinyl acetate-ethylene-acrylate copolymers, vinyl acetate-ethylene-styrene copolymers, polybutadiene and polyurethane. These thermoplastic resins are preferably used in combination with a plasticizer of at least one of Compounds No. 1, No. 7 and No. 12.

The use of a thermoplastic resin having tackiness or adhesiveness is preferably used for the purpose of the present invention, though a thermoplastic resin having no tackiness may be used. The use of a thermoplastic resin having a relatively low glass transition point Tg, in particular Tg of preferably −70 to 0° C., more preferably −67 to −25° C., is preferred for reasons of anti-blocking property and adhesiveness at an elevated temperature. It is also preferred that the thermoplastic resin have a weight molecular weight of 100,000 to 300,000 for the same reasons.

It is also preferred that at least one of the copolymers selected from acrylate copolymers, styrene-acrylate copolymers and ethylene-vinyl acetate copolymers be used as the thermoplastic resin. Especially preferred is the use of an acrylate copolymer containing 2-ethylhexyl acrylate as comonomer thereof for reasons of good adhesiveness upon being heated.

The heat-sensitive adhesive layer may contain a wax, such as an animal wax, a vegetable wax or a synthetic wax, or a heat-fusible substance such as a higher fatty acid, a higher fatty acid amide, a higher fatty acid anilide or an acetylated aromatic amine, for reasons of improved anti-blocking properties. Illustrative of suitable waxes are paraffin wax, carnauba wax, haze wax, montan wax, shellac, oxidized paraffin, polyethylene wax and oxidized polyethylene wax. Illustrative of suitable higher fatty acids are stearic acid and behenic acid. Illustrative of suitable higher fatty acid amides are stearamide, oleamide, N-methylstearamide, erucamide, N-methylol behenamide, N-methylol stearamide, methylenebis(stearamide) and ethylenebis(stearamide). Illustrative of suitable higher fatty acid anilides are stearanilide and linolanilide. Acetotoluide is an example of acetylated aromatic amine. An emulsion of higher fatty acid amide particles such as stearmide particles is particularly preferably used for reasons that it can improve anti-blocking properties without adversely affecting the adhesiveness.

The heat-sensitive adhesive layer may further contain a tackifier for improving adhesiveness thereof while suppressing blocking properties. Examples of such tackifiers include terpene resins, aliphatic petroleum resins, aromatic petroleum resins, phenolic resins, terpene-phenol resins, styrene resins and coumarone-indene resins. The tackifier is generally used in an amount of 200 parts by weight or less, preferably 20–150 parts by weight, per 100 parts by weight of the thermoplastic resin.

The heat-sensitive adhesive layer may additionally contain a filler for improving anti-blocking properties thereof. Illustrative of suitable fillers are inorganic fillers such as carbonates, oxides, hydroxides and sulfates of metals (e.g. aluminum, zinc, calcium, magnesium, barium and titanium), and clay minerals (e.g. silica, zeolite, kaolin and calcined kaolin); and organic fillers such as starch, styrene resins, polyolefin resins, melamine resins, acrylic resins, paraffins, natural wax and synthetic wax. The filler is generally used in an amount of 3–30% by weight, preferably 10–20% by weight, based on the total weight of solid matters constituting the heat-sensitive adhesive layer.

The heat-sensitive adhesive layer may further contain a water-soluble high molecular weight binder for the purpose of improving bonding strength between the adhesive layer and the substrate. Illustrative of suitable water-soluble binders are polyvinylalcohol, polyvinyl acetate, oxidized starch, etherized starch, cellulose derivatives (e.g. carboxymethyl cellulose and hydroxyethyl cellulose), casein, gelatin and sodium alginate. The water-soluble binder is generally used in an amount of 50% or less, preferably 5–35% by weight, based on the total weight of solid matters constituting the heat-sensitive adhesive layer.

The heat-sensitive adhesive layer may further contain various other additives such as film a hardening agent, an antiseptic agent, a coloring agent, a UV absorber, an anti-oxidation agent, a pH controlling agent and an anti-foaming agent.

For the purpose of efficiently utilizing the thermal energy applied to the heat-sensitive adhesive layer for creating adhesiveness therein while minimizing transfer of the heat to the substrate, a heat insulating layer may be suitably interposed between the substrate and the adhesive layer. The insulating layer may be constructed by incorporating therein hollow or void particles made of a resin such as an acrylic polymer or a polyvinylidene chloride. The void particles may be those formed previously or those formed in situ during the formation of the insulating layer, but the former is preferable. The insulating layer may be formed by, for example, applying a coating liquid in the form of a dispersion containing a binder and void particles to the substrate, the coated layer being then dried.

As described hereinafter, the heat-sensitive adhesive material of the present invention preferably has a heat-sensitive recording layer provided on opposite side of the substrate from the heat-sensitive adhesive layer. In such a case, it is not desirable that the heat energy applied to the heat-sensitive adhesive layer be transmitted to the heat-sensitive recording layer, thereby causing undesirable coloring of the recording layer. The insulating layer can serve to avoid such undesirable coloring of the recording layer during the heating of the heat-sensitive adhesive layer.

The minute void particles preferably have an average particle size of 5 to 20 $\mu$m, more preferably 1.5 to 8 $\mu$m, and are used in an amount of 30–85% by volume, preferably 40–70% by volume of the total volume of the heat insulating layer.

As the binder for the non-expanded insulating layer, a water-soluble polymer or an aqueous polymer emulsion is preferably used. Illustrative of suitable water-soluble polymers are polyvinyl alcohol, starch and starch derivatives, cellulose derivatives such as methoxy cellulose, hydroxyethyl cellulose, carboxymethyl cellulose, methyl cellulose and ethyl cellulose, sodium polyacrylate, polyvinyl pyrrolidone, acrylamide-acrylic ester copolymer, acrylamide-acrylic ester-methacrylic acid terpolymer, alkali salts of styrene-maleic anhydride copolymer, polyacrylamide, sodium alginate, gelatin and casein. Illustrative of suitable aqueous polymer emulsions are latexes such as styrene-butadiene copolymer and styrene-butadiene-acrylic copolymer and emulsions such as vinyl acetate resin, vinyl acetate-acrylic acid copolymer, styrene-acrylate copolymer, acrylate resin and polyurethane resin.

The substrate for supporting the heat-sensitive adhesive layer thereon may be any conventionally employed substrate such as paper, synthetic paper, non-woven fabric or a plastic film. Any paper conventionally employed in the field of heat-sensitive adhesive material may be used for the purpose of the present invention. The paper is generally composed of a wood pulp, a filler and one or more additives and prepared by a conventional paper-making machine. The paper may be calendared by machine calendar or super calendar to control the surface flatness thereof. Examples of papers include glassine paper, art paper, coated paper and cast paper. Examples of substrates other than paper include films or sheets made of a resin, such as polyethylene, polypropylene, polyethylene terephthalate or polyamide; synthetic papers or non-woven fabrics made of the above resin, laminate sheets having a resin film provided on one or both sides of paper or another resin film; metal foils; laminates of paper and metal foils; metal vacuum deposited paper; hologram-treated opaque sheets; mica paper; and glass paper. The thickness of the substrate is generally 10–400 $\mu$m, preferably 40–80 $\mu$m.

The heat-sensitive adhesive material of the present invention may be prepared by applying a coating liquid containing the above ingredients for the heat-sensitive adhesive layer on one side of the substrate. The applied coating is subsequently dried to form the heat-sensitive adhesive layer on the substrate. The coating liquid may be an organic solvent solution or an aqueous emulsion or dispersion (which may contain an organic solvent). Preferably, the coating liquid may be prepared by mixing an aqueous emulsion or dispersion (which may contain an organic solvent) containing the thermoplastic resin with a wet dispersion containing the solid plasticizer. The supercooling improving agent may be also mixed in the form of a wet dispersion. The tackifier may be also mixed in the form of an aqueous emulsion.

The emulsion and dispersion are mixed well and the mixture is preferably filtered through a filter of 100–1000 mesh size to obtain a coating liquid. The coating liquid is so stable that it is possible to transport the emulsion to a remote place. The plasticizer in the heat-sensitive adhesive layer is generally present in an amount of 50–800 parts by weight, preferably 95–400 parts by weight per 100 parts by weight of the thermoplastic resin.

When the heat-sensitive adhesive material has a heat-sensitive recording layer, a coating liquid for the recording layer is first applied onto one side of the substrate and dried. An optional protective layer is then coated on the recording layer, followed by calendaring. The coating liquid for the heat-sensitive adhesive layer is subsequently applied on the other side of the substrate.

The thermoplastic resin particles dispersed in the aqueous emulsion preferably have an average particle diameter of 0.1–1.0 $\mu$m, preferably 0.15–0.65 $\mu$m and have such a particle size distribution that at least 90% by weight thereof have a particle diameter of 1.5 $\mu$m or less, preferably 1.35 $\mu$m or less. The plasticizer particles generally have an average particle diameter of 0.5–15 $\mu$m, preferably 0.8–5 $\mu$m. The average particle diameter and the particle distribution herein are as measured with particle distribution measuring device LA-700 manufactured by Horiba Manufacturing Co., Ltd.

The coating of the coating liquid on the substrate may be carried out by any suitable conventional method using, for example, a blade coater, a gravure coater, a gravure offset coater, a bar coater, a roll coater, a knife coater, an air knife coater, a comma coater, a U comma coater, an ARKU coater, a smoothing coater, a micro-gravure coater, a reverse roll coater, a 4- or 5-roll coater, a dip coater, a drop curtain coater, a slide coater or a die coater. If desired, a printing method such as flexo printing, letter press printing, gravure printing or offset printing may be used for the application of the coating liquid for the formation of the heat-sensitive adhesive layer. The coating liquid is generally applied in an amount of 2–50 g/m$^2$, preferably 5–35 g/m$^2$, on the dry basis. Too small an amount of less than 2 g/m$^2$ is insufficient to provide satisfactory adhesiveness of the adhesive layer. No additional merit is obtainable when the coating exceeds more than 50 g/m$^2$.

The drying of the coated liquid on the substrate must be carried out at a temperature which does not cause the plasticizer to melt. Hot air, IR irradiation, microwave or high frequency may be utilized for the drying.

As described previously, an information indication layer is provided on opposite side of the substrate from the heat-sensitive adhesive layer. As the information indication layer, a heat-sensitive recording layer may be used.

The heat-sensitive recording layer contains a binder, a leuco dye and a developer. When the heat-sensitive recording layer is heated with, for example, a thermal head, the leuco dye colors by the action of the developer. Any suitable known leuco dyes and developers used in the conventional thermosensitive recording materials may be used for the purpose of the present invention.

The leuco dyes may be, for example, fluoran-type leuco compounds, triarylmethane-type leuco compounds, spiro-type leuco compounds, diphenylmethane-type leuco compounds, thiazine-type leuco compounds, lactom-type leuco compounds, and fluoren-type leuco compounds. Such leuco dyes preferably show an absorption spectrum in which at least one maximum absorption peak is present at a wavelength in the range of 550–1000 nm ($\lambda$max).

Specific examples of leuco dyes are as follows:
Fluoran Dyes
3-diethylamino-6-methyl-7-anilinofluoran,
3-dibutylamino-6-methyl-7-anilinofluoran,
3-(N-methyl-N-cyclohexylamino)-6-methyl-7-anilinofluoran,
3-(N-ethyl-N-cyclopentylamino)-6-methyl-7-anilinofluoran,
3-(N-isobutyl-N-ethylamino)-6-methyl-7-anilinofluoran,
3-[(N-ethyl-N-(3-ethoxypropyl)amino]-6-methyl-7-anilinofluoran,
3-(N-ethyl-N-hexylamino)-6-methyl-7-anilinofluoran,
3-dipentylamino-6-methyl-7-anilinofluoran;
Triarylmethane Dyes
3,3-bis(p-dimethylaminophenyl)-6-dimethylaminophthalide (crystal violet lactone; CVL),
3,3-bis(p-dimethylaminophenyl)phthalide,
3-(p-dimethylaminophenyl)-3-(1,2-dimethylindole-3-yl) phthalide,
3-(p-dimethylaminophenyl)-3-(2-methylindole-3-yl) phthalide,
3-(p-dimethylaminophenyl-3-(2-phenylindole-3-yl) phthalide;

Spiro Dyes
3-methyl-spiro-dinaphthopyrane,
3-ethyl-spiro-dinaphthopyrane,
3-benzyl-spiro-dinaphthopyrane,
3,3'-dichloro-spiro-dibenzopyrane;
Diphenylmethane
N-halophenyl-leucoauramine,
4,4'-bis-dimethylaminobenzhydrylbenzyl ether,
N-2,4,5-trichlorophenyl-leucoauramine;
Thiazine Dyes
benzoylleucomethylene blue,
p-nitrobenzoylmethylene blue;
Lactam Dyes
rhodamine B-anilinolactam,
rhodamine B-p-chloroanilinolactam;
Fluorene Dyes
3,6-bis(dimethylamino)fluorene-spiro-(9,3')-6'-dimethylaminophthalide,
3,6-bis(dimethylamino)fluorene-spiro-(9,3')-6'-pyrrolidinophthalide,
3-dimethylamino-6-diethylaminofluorene-spiro-(9,3')-6'-pyrrolidinophthalide;
Color Basic Leuco Dyes
3-diethylamino-6-methyl-7-chlorofluoran,
3-cyclohexylamino-6-chlorofluoran,
3-diethylaminobenzo [α]fluoran,
3-dibutylaminobenzo [α]fluoran,
3-diethylamino-7-chlorofluoran,
3-diethylamino-7-methylfluoran,
3-N-ethyl-N-isoamylamino)benzo [α]fluoran.

Leuco dyes may be used singly or in combination of two or more.

Any conventional developer used in the field of pressure-sensitive or heat-sensitive recording media may be used for inducing color formation of the above-mentioned leuco dyes. Such developers include, for example, phenol compounds, thiophenol compounds, thiourea compounds, organic acids and metal salts of organic acids. Specific examples of such color developers include:
bis(3-allyl-4-hydroxyphenyl)sulfone,
α-naphthol,
β-naphthol,
p-octylphenol,
4-t-octylphenol,
p-t-butylphenol,
p-phenylphenol,
1,1-bis(p-hydroxyphenyl)propane,
2,2-bis(p-hydroxyphenyl)propane (bisphenol A),
2,2-bis(p-hydroxyphenyl)butane,
1,1-bis(p-hydroxyphenyl)cyclohexane,
4,4'-thiobisphenol,
4,4'-cyclohexylidenediphenol,
2,2-(2,5-dibromo-4-hydroxyphenyl)propane,
4,4'-isopropylidenebis(2-t-butylphenol), 2,2'-methylenebis (4-chlorophenol).

Developers may be employed alone or in combination.

The heat-sensitive recording layer further contains a binder resin. Any conventionally employed binder such as a water-soluble natural or synthetic polymer may be suitably used for the purpose of the present invention. Examples of natural water-soluble polymers include cellulose derivatives such as methoxy cellulose, hydroxyethyl cellulose, carboxymethyl cellulose, methyl cellulose and ethyl cellulose, and sucrose such as starch, oxidized starch and esterified starch. Examples of water-soluble synthetic pollymers include polyvinyl alcohol, modified polyvinyl alcohol, polyvinyl pyrrolidone, polyacrylic acid, polysodium acrylate, acrylamide-acrylic ester copolymer, acrylamide-acrylic ester-methacrylic acid terpolymer, alkali salts of styrene-maleic anhydride copolymer, polyacrylamide, styrene-maleic anhydride. An aqueous polymer emulsion of polyvinyl acetate, polyurethane, polyacrylate, polymethacrylate, polybutylmethacrylate, vinyl chloride-vinyl acetate copolymer or ethylene-vinyl acetate copolymer, or a latex of styrene-butadiene copolymer and styrene-butadiene-acrylic copolymer may also be used as the binder.

The heat-sensitive recording layer may contain a heat-fusible material for improving heat sensitivity. Illustrative of suitable heat-fusible material are oxalate compounds such as dibenzyl oxalate and di-p-chlorobenzyl oxalate.

The heat-sensitive recording layer may additionally contains various conventionally employed additives such as a surfactant, an organic or inorganic filler and a lubricant. Examples of fillers include silica, zinc oxide, aluminum hydroxide, kaolin, calcined kaolin, clay, talc, calcium carbonate.

In addition to the heat-sensitive recording layer, one or more additional layers may be provided above and/or below the recording layer. For example, an intermediate layer, such as a heat insulating layer, may be interposed between the substrate and the heat-sensitive recording layer. The heat insulating layer is similar to that described previously and serves to improve heating efficiency for the heat-sensitive recording layer during recording. A protective layer may also be provided over the surface of the heat-sensitive recording layer to prevent fouling and to improve water-resistance. A print may be applied onto the heat-sensitive recording layer or the protective layer to provide additional information.

It is desirable that the heat-sensitive recording layer, the heat-insulating layer, the protective layer and the print layer be composed so that they do not adversely affect the function of the heat-sensitive adhesive layer. For example, when the print layer is provided, the ink therefor is desirably a UV-curable ink that is non-adhesive to the heat-sensitive adhesive layer.

The heat-sensitive recording layer, the heat-insulating layer and the protective layer may be formed by any conventionally employed method such as a blade coating, a gravure coating or any other coating method described previously with regard to the formation of the heat-sensitive adhesive layer.

Upon being manufactured, the heat-sensitive adhesive material according to the present invention is generally rolled around a mandrel or cut and stacked, and then packaged for transportation to users.

The heat-sensitive adhesive material may be thermally activated by any suitable means such as a heater plate, hot air, IR rays, a heated roll or a thermal head. The use of a thermal head is advantageous because heat generation can be controlled on demand, because thermal activation occurs simultaneous with electrical energization, and because heat may be efficiently and quickly transferred to the heat-sensitive adhesive layer. In particular, the use of a thermal head having a heating section at a near edge, a corner edge or an end surface thereof is advantageous, because ingredients constituting the heat-sensitive adhesive layer are prevented from sticking to the thermal head.

After being thermally activated, the heat-sensitive adhesive material is bonded to an article to be bonded. The article to be bonded is not specifically limited and can be any material, such as paper, resin and wood, having any thickness. The heat-sensitive adhesive material may be suitably used in POS system. Thus, the article to be bonded may be a resin film for packaging food. Even when the article to be bonded is a polyolefin film or sheet to which the conventional labels (inclusive of liner-free labels) are not usable under low temperature conditions, the heat-sensitive adhesive material of the present invention can show satisfactory adhesiveness.

In thermal activation of the heat-sensitive adhesive material according to the present invention capable of showing high adhesiveness in a wide temperature range of atmosphere, there is the following relationship between the heat energy at a higher temperature T1 and the heat energy at a lower temperature T2:

$$E1 < E2$$

which E1 is a heat energy providing the maximum adhesive strength when the atmosphere or material to be bonded has a temperature T1 and E2 is a heat energy providing the maximum adhesive strength when the atmosphere or material to be bonded has a temperature T2.

The thermal activation, thermal recording and bonding of the heat-sensitive adhesive material to an article to be bonded may be carried out using any suitable conventional means.

Figure 1:
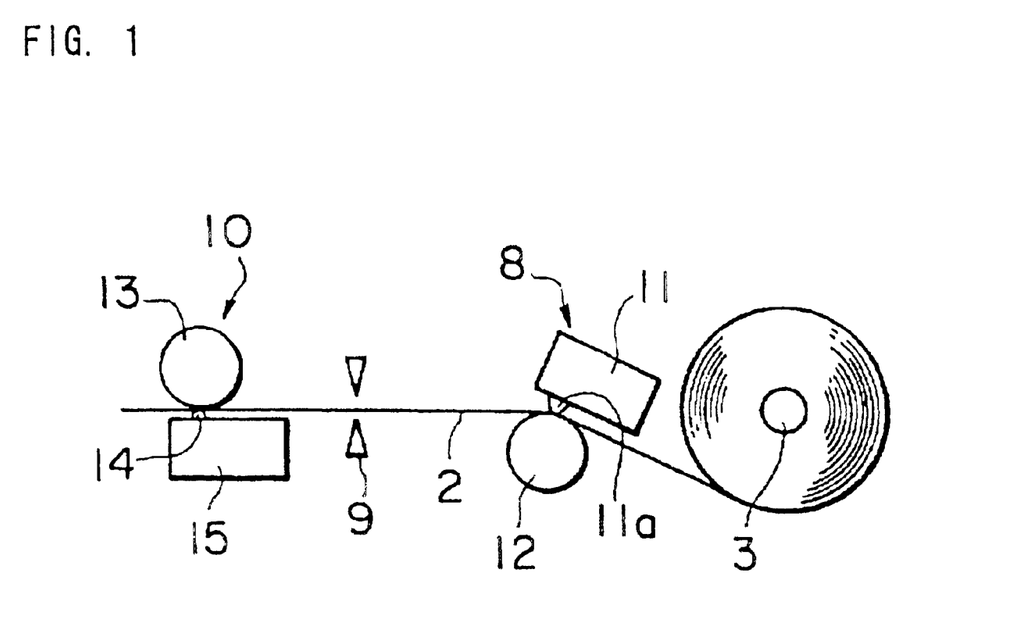
FIG. 1 is a schematic view schematically illustrating a structure of a label printer used for thermally printing and activating a heat-sensitive adhesive label having a substrate, a heat-sensitive recording layer provided on one side of the substrate, and a heat-sensitive adhesive layer provided on the other side of the substrate.

FIG. 1 is a schematic view schematically illustrating a structure of a label printer used for thermally printing and activating a heat-sensitive adhesive label 2 having a substrate, a heat-sensitive recording layer provided on one side of the substrate, and a heat-sensitive adhesive layer provided on the other side of the substrate. The heat-sensitive adhesive label 2 is held in the form of a roll by a label-holder 3. The heat-sensitive adhesive label 2 is passed through a printing apparatus 8 for printing images on the heat-sensitive recording layer of the heat-sensitive adhesive label 2 by the application of heat thereto. The label 2 is then fed to a cutter 9 where the label 2 is cut to a predetermined length. Designated as 10 is a heat activator for thermally activating the heat-sensitive adhesive layer of the label 2.

The printing apparatus 8 is provided with a thermal head 11 for recording an image on the heat-sensitive recording layer of the label 2 by the application of heat thereto and a platen roller 12 for holding and transporting the label 2. The heat activator 10 has a platen roll 13 for transporting the label 2 and a thin-film thermal head 15 provided with a heating section 14. The platen roll 13 also serves as a pressing member for urging the label 2 toward the heat-application portion 14 of the thermal head 15. The thin-film thermal head 15 can be energized, for example, in accordance with the pulse width by the on-demand system. The thermal head 15 is composed of a ceramic substrate on which a resistor has been deposited, and a protecting film made of glass and covering the resistor.

The following examples will further illustrate the present invention. Parts and percentages are by weight.

EXAMPLE 1

Preparation of Liquid Dispersion [A] Containing Solid Plasticizer

100 Parts of a solid plasticizer (Compound No. 19 shown above; melting point: 73° C.), were mixed with 300 parts of a dispersing medium composed of 100 parts of a 10% aqueous solution of polyvinyl alcohol and 200 parts of water and the mixture was pulverized with a ball mill to obtain a liquid dispersion [A] containing particles of the solid plasticizer having an average particle diameter of 1.0 μm.

Preparation of Coating Liquid [B] for Heat-sensitive Adhesive Layer

400 Parts of the above liquid dispersion [A] was mixed with 100 parts of an emulsion (solid content: 50%) containing 2-ethylhexyl acrylate copolymer (thermoplastic resin; glass transition point: −60° C.; average molecular weight: 450,000) and 50 parts of a dispersion containing 50% of terpene-phenol resin (tackifier) to obtain a coating liquid [B] for heat-sensitive adhesive layer.

Preparation of Heat-sensitive Adhesive Material

The above coating liquid [B] was applied on one side of a paper substrate using a wire bar in an amount of 12 g/m² (on dry basis) and the coating was dried to form a heat-sensitive adhesive layer on the substrate.

EXAMPLE 2

Preparation of Dispersion [C] Containing Dye 1.0 Part of 3-dibutylamino-6-methyl-7-anilinofluoran, 1.0 part of a 10% aqueous solution of polyvinyl alcohol and 2.0 parts of water were mixed with each other and the mixture was pulverized using a sand grinder to obtain a dispersion [C] containing dye particles having an average particle diameter of 0.7–1.0 μm.

Preparation of Dispersion [D] Containing Developer 3.0 Parts of 4-hydroxy-4'-isopropoxydiphenylsulfone, 1.0 part of silica and 4.0 parts of a 10% aqueous solution of polyvinyl alcohol were mixed with each other and the mixture was pulverized using a sand grinder to obtain a dispersion [D] containing developer particles having an average particle diameter of 3 μm.

Preparation of Coating Liquid [E] for Heat-sensitive Recording Layer 4.0 Parts of dispersion [C], 18.0 parts of dispersion [D] and 3.0 parts of water were mixed well to obtain a coating liquid [E] for heat-sensitive recording layer.

Preparation of Dispersion [F] Containing Silica 1.0 Parts of silica, 1.0 part of a 10% aqueous polyvinyl alcohol solution and 2.0 parts of water were mixed and the mixture was pulverized using a sand grinder to obtain a dispersion [F] containing silica particles having an average particle diameter of 3 μm.

Preparation of Coating Liquid [G] for Protective Layer 4.0 Parts of dispersion [F], 10.0 parts of a 10% aqueous polyvinyl alcohol solution, 1.0 part of a dispersion containing 30% zinc stearate (Z-730 manufactured by Chukyo Yushi Co., Ltd.), 3.2 parts of a 12.5% solution of a polyamide in epichlorohydrin and 5.8 parts of water were mixed well to obtain a coating liquid [G] for protective layer.

Preparation of Coating Liquid [H] for Heat-sensitive Adhesive Layer

The procedure for the preparation of coating liquid [B] in Example 1 was repeated in the same manner as described except that Compound No. 4 (melting point: 121° C.) was substituted for Compound No. 19, thereby obtaining a coating liquid [H] for a heat-sensitive adhesive layer.

Preparation of Heat-sensitive Adhesive Material

The above coating liquid [E] was applied on one side of a substrate (high quality paper having a basis weight of 50 g/m²) using a wire bar in such an amount of about 0.5 g/m² in terms of the weight of the leuco dye and the coating was dried to form a heat-sensitive recording layer. Coating liquid [G] was then applied using a wire bar in an amount of 3.5 g/m² (on dry basis) and the coating was dried to form a protective layer on the heat-sensitive recording layer. The protective layer was then calendared to a surface smoothness of 2000 s (Oken smoothness measuring meter). On the other side of the substrate was applied the coating liquid [H] in an amount of 12 g/m² (on dry basis) and the coating was dried to form a heat-sensitive adhesive layer on the substrate.

EXAMPLE 3

Preparation of Liquid Dispersion [I] Containing Solid Plasticizer

100 Parts of a solid plasticizer (Compound No. 2; melting point: 105° C.) were mixed with 300 parts of a dispersing medium composed of 100 parts of a 10% aqueous solution of polyvinyl alcohol and 200 parts of water and the mixture was pulverized with a ball mill to obtain a liquid dispersion [I] containing particles of the solid plasticizer having an average particle diameter of 1.0 μm.

Preparation of Liquid Dispersion [J] Containing Supercooling Improving Agent

100 Parts of a dibenzyl oxalate (supercooling improving agent; melting point: 80° C.) were mixed with 400 parts of a dispersing medium composed of 100 parts of a 10% aqueous solution of polyvinyl alcohol and 300 parts of water and the mixture was pulverized with a ball mill to obtain a liquid dispersion [J] containing particles of the supercooling improving agent having an average particle diameter of 15.0 μm and such a particle size distribution that at least 90% thereof have a particle diameter of 1.0 μm or less.

Preparation of Coating Liquid [K] for Heat-sensitive Adhesive Layer

400 Parts of the above liquid dispersion [I] was mixed with 100 parts of the liquid dispersion [J], 100 parts of an emulsion (solid content: 50%) containing 2-ethylhexyl acrylate copolymer (thermoplastic resin; glass transition point: −60° C.; average molecular weight: 450,000) and 50 parts of a dispersion containing 50% of terpene-phenol resin (tackifier) to obtain a coating liquid [K] for heat-sensitive adhesive layer.

Preparation of Heat-sensitive Adhesive Material

The procedure of the preparation of heat-sensitive adhesive material in Example 2 was repeated in the same manner as described except that the above coating liquid [K] was substituted for the coating liquid [H] to form a heat-sensitive adhesive layer.

EXAMPLE 4

Example 3 was repeated in the same manner as described except that 4-acetylbiphenyl (supercooling improving agent; melting point: 120° C.) was substituted for dibenzyl oxalate.

EXAMPLE 5

Example 3 was repeated in the same manner as described except that Compound No. 1 (solid plasticizer; melting point: 80° C.) was substituted for Compound No. 2 and that methyl stearate (supercooling improving agent; melting point: 40° C.) was substituted for dibenzyl oxalate.

EXAMPLE 6

Example 5 was repeated in the same manner as described except that dibenzyl oxalate (supercooling improving agent; melting point: 80° C.) was substituted for methyl stearate.

EXAMPLE 7

Example 5 was repeated in the same manner as described except that 4-acetylbiphenyl (supercooling improving agent; melting point: 120° C.) was substituted for methyl stearate.

EXAMPLE 8

Example 6 was repeated in the same manner as described except that Compound No. 8 (solid plasticizer; melting point: 141° C.) was substituted for Compound No. 1.

EXAMPLE 9

Example 8 was repeated in the same manner as described except that 4-acetylbiphenyl (supercooling improving agent; melting point: 120° C.) was substituted for dibenzyl oxalate.

EXAMPLE 10

Example 8 was repeated in the same manner as described except that p-benzylbiphenyl (supercooling improving agent; melting point: 87° C.) was substituted for dibenzyl oxalate.

EXAMPLE 11

Example 8 was repeated in the same manner as described except that m-terphenyl (supercooling improving agent; melting point: 86° C.) was substituted for dibenzyl oxalate.

EXAMPLE 12

Example 9 was repeated in the same manner as described except that Compound No. 10 (solid plasticizer; melting point: 160° C.) was substituted for Compound No. 8.

EXAMPLE 13

Preparation of Dispersion [L] Containing Inorganic Filler

100 Parts of aluminum hydroxide powder were mixed with 300 parts of a dispersing medium composed of 100 parts of a 10% aqueous solution of polyvinyl alcohol and 200 parts of water and the mixture was pulverized with a ball mill to obtain a liquid dispersion [L] containing particles of the inorganic filler having an average particle diameter of 1.0 μm.

Preparation of Coating Liquid [M] for Heat-sensitive Adhesive Layer

To the coating liquid used in Example 9 for forming a heat-sensitive adhesive layer was added 50 parts of the dispersion [L], thereby obtaining a coating liquid [M] for a heat-sensitive adhesive layer.

Preparation of Heat-sensitive Adhesive Material

The procedure of the preparation of heat-sensitive adhesive material in Example 9 was repeated in the same manner as described except that the above coating liquid [M] was substituted for the coating liquid [L] to form a heat-sensitive adhesive layer.

EXAMPLE 14

Preparation of Coating Liquid [N] for Heat Insulating Layer 4.0 Parts of an emulsion (solid matter content: 25%) containing void particles (voidage: 50%), 0.4 part of a styrene latex (solid matter content: 50%), 1.0 part of a 10% aqueous polyvinyl alcohol and 1.1 parts of water were mixed well to form a coating liquid [N] for a heat insulating layer.

Preparation of Heat-sensitive Adhesive Material

The procedure of the preparation of heat-sensitive adhesive material in Example 9 was repeated in the same manner as described except that the above coating liquid [N] was coated on the substrate in an amount of 2.0 g/m² (on dry basis) and dried before the formation of the heat-sensitive adhesive layer. Thus, a heat insulating layer was interposed between the substrate and the heat-sensitive adhesive layer.

COMPARATIVE EXAMPLE 1

Example 1 was repeated in the same manner as described except that the emulsion containing 2-ethylhexyl acrylate copolymer (glass transition point: −60° C.; average molecular weight: 450,000) was replaced by an emulsion containing natural rubber-methyl methacrylate graft copolymer (glass transition point: −10° C.; average molecular weight: 300,000) and that a heat-sensitive recording layer was provided on opposite side of the substrate from the heat-sensitive adhesive layer.

COMPARATIVE EXAMPLE 2

Example 7 was repeated in the same manner as described except that the 4-acetylbiphenyl was not used at all.

COMPARATIVE EXAMPLE 3

Example 9 was repeated in the same manner as described except that the 4-acetylbiphenyl was not used at all.

COMPARATIVE EXAMPLE 4

Example 12 was repeated in the same manner as described except that the 4-acetylbiphenyl was not used at all.

Each of the heat-sensitive adhesive materials obtained in Examples 1–7 and Comparative Examples 1 and 2 was subjected to a scratch test (at 0° C.) and an adhesion test (at 0° C.) according to the following procedures. The results are summarized in Table 1.

Scratch Test

A heat-sensitive adhesive material is cut to obtain a sample having a size of 40 mm×90 mm. The sample is thermally activated with a heat sensitive printer (TH-PMD manufactured by Okura Denki Co., Ltd.) under the following conditions:

| thermal head: | 0.54 mJ/dot |
|---|---|
| print speed: | 4 ms/line |
| platen pressure: | 6 kgf/line. |

The thermally activated sample is fixed on a stage of HEIDON tester. The surface tackiness is measured in accordance with Japanese Industrial Standard JIS K5401-1969 using a ball-tip pen having an aluminum ball with a diameter of 0.1 mm under the following conditions:

| Load applied to pen: | 1.0 kg |
|---|---|
| Angle between pen and adhesive layer: | 45° |
| Scratch speed: | 75 mm/min |
| Temperature: | 0° C. |

The surface tackiness is expressed in terms of a force (unit: gf) required to move the pen. Thus, for example, a measured value of 440 gf indicates that a force of 440 gf was required to move the pen (scratch the adhesive surface). The greater the tackiness, the larger becomes the measured value. A small measured value indicates that the adhesive surface is not sufficiently activated or becomes almost like a fluid so that the tackiness is low.

Adhesion Test

A heat-sensitive adhesive material is cut to obtain a sample having a size of 40 mm×90 mm. The sample is thermally activated with a heat sensitive printer (TH-PMD manufactured by Okura Denki Co., Ltd.) under the following conditions:

| thermal head: | 0.54 mJ/dot |
|---|---|
| print speed: | 4 ms/line |
| platen pressure: | 6 kgf/line. |

The thermally activated sample is applied, while pressing at a pressure of 2 kg using a rubber roller, to a polyolefin film (Diawrap Super manufactured by Mitsubishi Jushi Co., Ltd.) with the longitudinal axis of the sample being in parallel with the process direction of the film. After allowed to stand at 0° C. for 30 minutes, the sample is peeled at a peel speed of 300 mm/min with a peel angle of 180° C. The adhesion strength is expressed in terms of a force (unit: gf/40 mm) required for peeling.

TABLE 1

| Example No. | Scratch Test at 0° C. (gf) | Adhesion Test at 0° C. (gf/40 mm) |
|---|---|---|
| 1 | 440 | 3110 |
| 2 | 404 | 3041 |
| 3 | 291 | 2150 |
| 4 | 244 | 1849 |
| 5 | 380 | 2771 |
| 6 | 345 | 2570 |
| 7 | 310 | 2354 |
| Comparative Ex. 1 | 98 | 298 |
| Comparative Ex. 2 | 32 | 0 |

From the results shown in Table 1, it is seen that the heat-sensitive adhesive materials of Examples 1–7 exhibit high adhesiveness at a low temperature environment.

Each of the heat-sensitive adhesive materials obtained in Examples 8–12 and Comparative Examples 1–4 was subjected to a scratch test, an adhesion test, a gloss test and anti-blocking test according to the following procedures. The results are summarized in Table 3.

Scratch Test

The test method is the same as described above except that the test is carried out not only at 0° C. but also at 20° C.

Adhesion Test

The test method is the same as described above except that the test is carried out not only at 0° C. but also at 20° C. and 40° C.

Gloss Test

A heat-sensitive adhesive material is brought into pressure and heat contact with a hot block of a heat gradient tester at 80° C. for 1 second with a load of 2 kg. Gloss is measured before and after the test and a difference therebetween (%) is calculated.

Anti-blocking Test

Two same heat-sensitive adhesive materials are superposed such that the heat-sensitive layer of one material and the protective layer of the other material are contacted. The two materials are then maintained in pressure contact with each other at 60° C. and 1 kg/cm$^2$ for 24 hours under a dry atmosphere. After being allowed to cool to room temperature, the two materials are separated from each other. During separation, sound, resistance to separation, transfer of components from one material to the other, and delamination of material are checked and scored according to the standard shown in Table 2. An average score represents the anti-blocking property.

TABLE 2

(Anti-Blocking)

| Score | Resistance to separation | Peel sound | Transfer in spots | Delamination |
|---|---|---|---|---|
| 10 | none | none | none | none |
| 9 | slight | | | |
| 8 | significant | slight | | |
| 7 | | significant | | |
| 6 | | | slight | |
| 5 | | | 30–50% | |
| 4 | | | over 50% | |
| 3 | | | | slight |
| 2 | | | | 30–50% |
| 1 | | | | over 50% |

TABLE 3

| Example No. | Scratch Test (gf) | | Adhesion Test (gf/40 mm) | | | Gloss Test 80° C. | Anti-blocking 60° C. |
|---|---|---|---|---|---|---|---|
| | 0° C. | 20° C. | 0° C. | 20° C. | 40° C. | | |
| 8 | 285 | 264 | 2110 | 1841 | 953 | 15 | 7 |
| 9 | 270 | 254 | 2050 | 1780 | 1020 | −2 | 8 |
| 10 | 175 | 320 | 950 | 2778 | 1241 | 13 | 7 |
| 11 | 190 | 286 | 1025 | 2221 | 1105 | −17 | 7 |
| 12 | 240 | 189 | 1660 | 1483 | 940 | 0 | 10 |
| Comp.1 | 98 | 68 | 298 | 54 | 21 | 22 | 6 |
| Comp.2 | 32 | 320 | 0 | 2451 | 1050 | 25 | 5 |
| Comp.3 | 20 | 350 | 0 | 2012 | 2030 | 14 | 7 |
| Comp.4 | 5 | 386 | 0 | 1840 | 2441 | 1 | 9 |

From the results shown in Table 3, it is seen that the heat-sensitive adhesive materials of Examples 8–12 exhibit high adhesiveness both at 20° C. and 40° C. and good anti-blocking property (average score is 7 or more) at 60° C.

The invention may be embodied in other specific forms without departing from the spirit or essential characteristics thereof. The present embodiments are therefore to be considered in all respects as illustrative d not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2000-300803, filed Sep. 29, 2000 and 2000-300941, filed Sep. 29, 2000, inclusive of the specification and claims, are hereby incorporated by reference herein.

What is claimed is:

1. A heat-sensitive adhesive material comprising a substrate and a heat-sensitive adhesive layer provided thereon and having one of the following properties (a) and (b):
   (a) the heat-sensitive adhesive layer, when thermally activated, exhibits an adhesive strength in the range of 1800–3500 gf/40 mm at 0–10° C.;
   (b) the heat-sensitive adhesive layer, when thermally activated, exhibits a scratch resistance in the range of 150–500 gf at 0° C,
   wherein the heat-sensitive adhesive layer comprises a thermoplastic resin, a solid plasticizer and a supercooling improving agent being in the form of particles having an average particle diameter of 0.2–10 µm and such a particle distribution that at least 90% by weight thereof have a particle diameter of not greater than 20.0 µm.

2. A heat-sensitive adhesive material as claimed in claim 1, wherein said supercooling improving agent has a melting point of 60–180° C.

3. A heat-sensitive adhesive material as claimed in claim 1, wherein said supercooling improving agent is a substance which, when mixed with said solid plasticizer and melted, provides a liquid that does not solidify when cooled to room temperature.

4. A heat-sensitive adhesive material as claimed in claim 1, wherein the weight ratio of said supercooling improving agent to said solid plasticizer is 100:0.5 to 100:60.

5. A heat-sensitive adhesive material as claimed in claim 1, wherein said supercooling improving agent is a compound selected from the group consisting of oxalic acid diesters represented by the following formula (1):

(1)

wherein $R^1$ and $R^2$ stand independently from each other for an aromatic group which contains one or more substituents and biphenyl compounds represented by the following formula (21):

(21)

wherein $R^5$ stands for an acyl group, an aralkyl group, an aryl group or an alkyloxy group.

6. A heat-sensitive adhesive material as claimed in claim 1, wherein said solid plasticizer is at least one copolymer selected from the group consisting of acrylic ester copolymers, styrene-acrylic acid copolymers and ethylene-vinyl acetate copolymers.

7. A heat-sensitive adhesive material as claimed in claim 1, wherein said solid plasticizer is an acrylic acid ester copolymer containing 2-ethylhexyl acrylate as a comonomer thereof.

8. A heat-sensitive adhesive material as claimed in claim 1, wherein said solid plasticizer has a glass transition point of −70° C. to 0° C.

9. A heat-sensitive adhesive material as claimed in claim 1, wherein said solid plasticizer has a weight average molecular weight of 30,000 to 300,000.

10. A heat-sensitive adhesive material as claimed in claim 1, wherein said heat-sensitive adhesive layer further comprises an inorganic filler.

11. A heat-sensitive adhesive material as claimed in claim 1, further comprising a heat-sensitive recording layer provided on opposite side of said substrate from said heat-sensitive adhesive layer.

12. A heat-sensitive adhesive material as claimed in claim 1, in the form of a roll wound around a mandrel.

13. A heat-sensitive adhesive material as claimed in claim 1, and being cut, stacked and packaged.

14. A device for developing adhesiveness, comprising a heat-sensitive adhesive material according to claim 1, and heating means disposed to heat the heat-sensitive layer thereof.

15. A heat-sensitive adhesive material as claimed in claim 1, further comprising a heat insulating layer provided between said heat-sensitive adhesive layer and said substrate.

16. A heat-sensitive adhesive material as claimed in claim 15, wherein said heat insulating layer comprises hollow particles dispersed therewithin.

17. A method of developing adhesiveness of a heat-sensitive adhesive material according to claim 1, comprising heating a surface of said heat-sensitive adhesive layer with a thermal head.

18. A method as claimed in claim 17, further comprising bonding said heated heat-sensitive layer to a surface to be bonded.

19. A method as claimed in claim 18, wherein said surface to be bonded is a polyolefin resin surface.

20. A cover material having a surface to which the heat-sensitive layer of a heat-sensitive adhesive material according to claim 1 has been bonded.

21. A food wrapped with a cover material according to claim 20 in the form of a synthetic resin film.

22. A heat-sensitive adhesive material comprising a substrate and a heat-sensitive adhesive layer provided thereon and having one of the following properties (a) and (b):
   (a) the heat-sensitive adhesive layer, when thermally activated, exhibits an adhesive strength in the range of 500–3500 gf/40 mm at 0–40° C.;
   (b) the heat-sensitive adhesive layer, when thermally activated, provides a scratch resistance in the range of 150–500 gf at both 0° C. and 20° C.,
   wherein the heat-sensitive adhesive layer comprises a thermoplastic resin, a solid plasticizer and a supercooling improving agent being in the form of particles having an average particle diameter of 0.2–10 µm and such a particle distribution that at least 90% by weight thereof have a particle diameter of not greater than 20.0 µm.

23. A heat-sensitive adhesive material as claimed in claim 22, wherein said solid plasticizer has a melting point of 70–200° C.

24. A heat-sensitive adhesive material as claimed in claim 22, wherein said solid plasticizer is a substance which, when melted, provides a liquid that does not solidify when cooled to 20° C.

25. A heat-sensitive adhesive material as claimed in claim 22, wherein said heat-sensitive adhesive layer shows a gloss A1 during non-activated state and a gloss A2 upon being thermally activated by being contacted with a heated surface at 80° C. for 1 second at a pressure of 2 kg/cm², and wherein (A1–A2) is in the range of −20% to 20%.

26. A heat-sensitive adhesive material as claimed in claim 22, wherein said solid plasticizer is at least one copolymer selected from the group consisting of acrylic ester copolymers, styrene-acrylic acid copolymers and ethylene-vinyl acetate copolymers.

27. A heat-sensitive adhesive material as claimed in claim 22, wherein said solid plasticizer is an acrylic acid ester copolymer containing 2-ethylhexyl acrylate as a comonomer thereof.

28. A heat-sensitive adhesive material as claimed in claim 22, wherein said solid plasticizer has a glass transition point of −70° C. to 0° C.

29. A heat-sensitive adhesive material as claimed in claim 22, wherein said solid plasticizer has a weight average molecular weight of 30,000 to 300,000.

30. A heat-sensitive adhesive material as claimed in claim 22, wherein said heat-sensitive adhesive layer further comprises an inorganic filler.

31. A heat-sensitive adhesive material as claimed in claim 22, further comprising a heat-sensitive recording layer provided on opposite side of said substrate from said heat-sensitive adhesive layer.

32. A heat-sensitive adhesive material as claimed in claim 22, in the form of a roll wound around a mandrel.

33. A heat-sensitive adhesive material as claimed in claim 22, and being cut, stacked and packaged.

34. A device for developing adhesiveness, comprising a heat-sensitive adhesive material according to claim 22, and heating means disposed to heat the heat-sensitive layer thereof.

35. A heat-sensitive adhesive material as claimed in claim 22, wherein said solid plasticizer is a compound which is solid at 20° C. and which is selected from the group consisting of hindered phenol compounds, benzotriazole compounds, aromatic sulfonamide and phthalic acid compounds.

36. A heat-sensitive adhesive material as claimed in claim 35, wherein said solid plasticizer is a substance which, when melted, provides a liquid that does not solidify when cooled to 20° C.

37. A heat-sensitive adhesive material as claimed in claim 22, further comprising a heat insulating layer provided between said heat-sensitive adhesive layer and said substrate.

38. A heat-sensitive adhesive material as claimed in claim 37, wherein said heat insulating layer comprises hollow particles dispersed therewithin.

39. A method of developing adhesiveness of a heat-sensitive adhesive material according to claim 22, comprising heating a surface of said heat-sensitive adhesive layer with a thermal head.

40. A method as claimed in claim 39, further comprising bonding said heated heat-sensitive layer to a surface to be bonded.

41. A method as claimed in claim 40, wherein said surface to be bonded is a polyolefin resin surface.

42. A cover material having a surface to which the heat-sensitive layer of a heat-sensitive adhesive material according to claim 22 has been bonded.

43. A food wrapped with a cover material according to claim 42 in the form of a synthetic resin film.

44. A heat-sensitive adhesive composition comprising a thermoplastic resin, a solid plasticizer, and a supercooling improving agent, wherein said supercooling improving agent is in the form of particles having an average particle diameter of 0.2-10 μm and such a particle size distribution that at least 90% by weight thereof have a particle diameter of not greater than 20.0 μm.

45. A heat-sensitive adhesive material comprising a substrate and a heat-sensitive adhesive layer provided thereon and comprising a thermoplastic resin, a solid plasticizer and a supercooling improving agent selected from the group consisting of oxalic acid diesters represented by the following formula (1):

(1)

wherein $R^1$ and $R^2$ stand independently from each other for an aromatic group which contains one or more substituents and biphenyl compounds represented by the following formula (21):

(21)

wherein $R^5$ stands for an acyl group, an aralkyl group, an aryl group or an alkyloxy group.

* * * * *